(12) United States Patent
Young (10) Patent No.: US 10,542,728 B2
(45) Date of Patent: Jan. 28, 2020

(54) WILDLIFE FEEDER VARMINT SHIELD

(71) Applicant: Timothy Joe Young, Poteau, OK (US)

(72) Inventor: Timothy Joe Young, Poteau, OK (US)

( * ) Notice: Subject to any disclaimer, the term of this patent is extended or adjusted under 35 U.S.C. 154(b) by 129 days.

(21) Appl. No.: 15/479,257

(22) Filed: Apr. 4, 2017

(65) Prior Publication Data

US 2017/0280677 A1  Oct. 5, 2017

Related U.S. Application Data

(60) Provisional application No. 62/390,613, filed on Apr. 4, 2016.

(51) Int. Cl.
  *A01K 5/00* (2006.01)
  *A01K 5/02* (2006.01)
  *A01M 31/00* (2006.01)

(52) U.S. Cl.
  CPC .......... *A01K 5/0225* (2013.01); *A01K 5/0291* (2013.01); *A01M 31/008* (2013.01)

(58) Field of Classification Search
  CPC .............. A01K 5/0225; A01K 5/0142; A01K 39/0113; A01K 39/0142; A01M 31/008
  See application file for complete search history.

(56) References Cited

U.S. PATENT DOCUMENTS

| | | | | |
|---|---|---|---|---|
| 2,112,229 A | * | 3/1938 | Davis ..................... | A01M 1/103 43/107 |
| 3,768,441 A | * | 10/1973 | Laham ................. | A01K 15/006 119/174 |
| 5,203,795 A | * | 4/1993 | Balamut ............... | E04B 1/0023 43/124 |
| 5,285,748 A | * | 2/1994 | Weldin ............... | A01K 39/0113 119/57.9 |
| 5,347,769 A | * | 9/1994 | Dinsmore ............... | E01F 9/623 52/101 |
| 5,353,556 A | * | 10/1994 | Hand ................... | A01G 13/105 43/108 |
| 6,098,348 A | * | 8/2000 | Weaver .............. | A01K 39/0113 119/52.3 |

(Continued)

*Primary Examiner* — Michael H Wang
(74) *Attorney, Agent, or Firm* — Scott R. Zingerman (57) ABSTRACT

The present disclosure includes a varmint shield for a wildlife feeder supported by at least one leg. The varmint shield includes a body having a length, a back side and a front side, a top end and a bottom end; and a first side and a second side. A notch is cut in the top end of the body. A plurality of mounting tabs are formed by bending the body at the notch toward the front side, each including at least one hole for receiving a fastening means such as a screw for securing the body to the wildlife feeder. The body of the varmint shield is bent along its length from the top end to the bottom end at an angle sufficient to deflect feed expelled from the wildlife feeder outwardly and away from the wildlife feeder. The body may also include beads formed along its length for structural strength and cuffs folded along its edges. A first shoulder and a second shoulder are preferably cut in the bottom end of the body. The first shoulder and the second shoulder preferably include edges folded to form cuffs. These cuffs aid in structural rigidity. At least one hole may be drilled in the body adjacent the bottom end for securing the body to the at least one leg of the wildlife feeder.

7 Claims, 5 Drawing Sheets

(56) References Cited

U.S. PATENT DOCUMENTS

| | | | | |
|---|---|---|---|---|
| 6,269,771 B1 * | 8/2001 | Cotter | ............... | A01K 39/0113 |
| | | | | 119/57.9 |
| 6,532,894 B2 * | 3/2003 | Johnson | ............. | A01K 39/0113 |
| | | | | 119/52.3 |
| 6,588,367 B1 * | 7/2003 | MacManus | .......... | A01K 5/0142 |
| | | | | 119/51.01 |
| 6,640,746 B1 * | 11/2003 | Lund | .................. | A01K 39/0113 |
| | | | | 119/57.9 |
| 7,574,976 B2 * | 8/2009 | Ellen | ................. | A01K 39/0113 |
| | | | | 119/52.3 |
| 8,104,430 B1 * | 1/2012 | Powell, Jr. | ......... | A01K 39/0113 |
| | | | | 119/52.3 |
| 8,360,005 B1 * | 1/2013 | Allen | ................. | A01K 5/0142 |
| | | | | 119/61.53 |
| D757,372 S * | 5/2016 | Clinton | ............... | E04B 1/0023 |
| | | | | D30/121 |
| 2014/0345537 A1 * | 11/2014 | Moore | .................... | A01K 3/00 |
| | | | | 119/524 |

* cited by examiner

WILDLIFE FEEDER VARMINT SHIELD

CROSS REFERENCE TO RELATED APPLICATION

This application claims the benefit of U.S. Provisional Application No. 62/390,613 filed Apr. 4, 2016, herein incorporated by reference in its entirety for all purposes.

FIELD OF THE INVENTION

The present invention relates to wildlife feeders and particularly devices for the prevention of varmints from accessing the food contained/stored within the wildlife feeder.

BACKGROUND OF THE INVENTION

Wildlife feeders are commonly used by hunters and other wildlife enthusiasts in order to attract wildlife such as deer, turkey, and other such animals. Wildlife feeders are commonly placed in remote locations and left unattended for substantial periods of time. A volume of feed, such as typically corn, are held by the wildlife feeder and distributed at set intervals. Wildlife then frequent the feeder locations and consume the feed. Wildlife cameras are typically positioned near wildlife feeders to record, either still or video, the animals which are attracted to the feeder by the feed. The feeder and cameras are attended sometimes infrequently at which time the feeder is restocked, and checked for operation.

Typical wildlife feeder design includes a hopper of some sort for receiving and storing a bulk volume of feed intended to be distributed by the wildlife feeder at the set intervals over a period of time. The hopper is supported by at least one leg and typically three legs arranged in a tripod fashion. However, the design of wildlife feeders varies. As such, the definition of wildlife feeder as used herein should be understood to include various feeder designs. An electric motor is typically secured to the hopper most typically underneath the hopper. The motor commonly spins some type of mechanism for expelling and disbursing feed. Feed from the hopper most commonly is gravity fed into the rotating disbursal mechanism driven by the motor. At set intervals, the motor is actuated and a volume of feed from the hopper is expelled typically radially around the wildlife feeder.

The wildlife feeder typically includes a motor, typically an electric motor, commonly in electrical communication with a battery. The battery is frequently in electrical communication with a solar panel which recharges the battery. A timer is also frequently in electrical communication with the motor and the battery such that the timer measures the intervals between the time the motor is activated. Upon set time periods the timer activates the motor to distribute feed from the hopper to the area surrounding the wildlife feeder. The timer activates the motor for a desired, set time period. The interval between the time that the hopper must be refilled is determined by the amount of feed in the hopper, the interval between the times that the motor is operated, and the duration of time that the motor is activated distributing feed.

One known and persistent problem with wildlife feeder operation is the fact that varmints are known to climb the legs of the wildlife feeder in an effort to access the feed within the hopper. Varmints include commonly racoons and squirrels however other varmints are contemplated herein which are also known to climb the legs of wildlife feeders. Over time, varmints learn where the feed is expelled from the hopper by the motor. Varmints are known to climb the legs of the wildlife feeder and reach over to spin the feeder assembly by hand which has the same effect of dispensing feed from the hopper as does activation of the motor. Once expelled, the feed can be collected by the varmint or most typically multiple varmints which cooperate to access the feed. The result being that the varmints quickly empty the hopper of feed. This results in a greater expense to the wildlife enthusiast who must consistently refill the hopper. In addition, if the wildlife enthusiast is unaware that the hopper is empty, the motor will still be activated at the set intervals, however, no feed will be expelled. As a result, the desired wildlife may no longer frequent the feeder. A need, therefore exists for a device which prevents varmints from climbing the legs of wildlife feeders.

Another known problem is that varmints which do access the feeder hopper are known to break solar panels and cut electrical wiring resulting in costly repairs.

SUMMARY OF THE INVENTION

The present disclosure includes a varmint shield for a wildlife feeder. Wildlife feeders are used for expelling feed and have a feed hopper supported by at least one leg. The varmint shield of the present disclosure includes a body having a length, a back side and a front side, a top end and a bottom end; and a first side and a second side. A notch is cut in the top end of the body. A plurality of mounting tabs are formed by bending the body at the notch toward the front side, each including at least one hole for receiving a fastening means such as a screw for securing the body to the at least one leg of the wildlife feeder. The body of the varmint shield is bent along its length from the top end to the bottom end at an angle sufficient to deflect feed expelled from the wildlife feeder outwardly and away from the wildlife feeder. The body may also include beads formed along its length for structural strength. The first side and the second side may include edges including cuffs folded along the edges of the first side and the second side also for structural purposes. A first shoulder and a second shoulder are preferably cut in the bottom end of the body. The first shoulder and the second shoulder preferably include edges folded to form cuffs. These cuffs aid in structural rigidity. At least one hole may be drilled in the body adjacent the bottom end for securing the body to the at least one leg of the wildlife feeder.

The varmint shield of the present disclosure is a device to be applied to the leg(s) of a wildlife feeder. When applied to the top portion of a wildlife feeder leg, or multiple legs, adjacent the feeder body, the varmint shield of the present disclosure will prevent vermin, including but not limited to racoons, as well as rodents, including but not limited to squirrels, and other problematic varmints from ascending the feeder leg(s) to reach the feeder body and particularly the feeder motor. The varmint shield of the present disclosure therefore prevents these nuisance animals from: 1) stealing feed; 2) damaging solar panels and wiring of the feeder; 3) damaging the motor, timer or battery wires of the feeder; 4) causing the feeder timer to malfunction; 5) increase the time between feeder fill up of food, therefore preventing lost opportunities in the woods to hunt or view desired wildlife because varmints have emptied the feeder of food when the feeder was not attended.

The varmint shield of the present disclosure will, over time, save a considerable amount of the feed stored in the feeder from being eaten and or wasted by unwanted animals, therefore saving the owner money. The varmint shield of the present disclosure will also produce an audible noise when the feeder motor goes off (dispenses feed) as the feed strikes the metallic and or plastic surface of the varmint shield, thereby alerting desirable animals that the feeder has gone off. It is contemplated that this extra noise will be useful for attracting and conditioning deer and other desirable wildlife to come to the feeder which will make the feeder more useful to hunters and other wildlife enthusiasts.

The varmint shield of the present disclosure is V-shaped or chevron-shaped in a preferred embodiment. In alternate embodiments the varmint shield of the present disclosure may be triangular, round (cylindrical), or tear drop in shape.

The varmint shield in a preferred embodiment will have pre-drilled holes that will allow it to be attached to the upright or somewhat upright legs of wildlife feeder constructions as known in the art. The varmint shield may also possess 2 additional mounting tabs in a preferred embodiment at the top that will allow the shield to be attached to the bottom of the feeder for added strength.

The varmint shield may have a crease from top to bottom, with pre-drilled mounting holes on both sides of the crease. This allows the shield to be installed around the feeder legs allowing self-tapping screws to be inserted through the holes and into the respective leg of the feeder to secure the varmint shield to a leg of a feeder. A separate varmint shield may be secured to each leg of the feeder as described to prevent varmints from climbing any respective leg of the feeder to reach the body of the feeder and particularly the motor.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

DETAILED DESCRIPTION OF THE PREFERRED EMBODIMENTS

Figure 1:
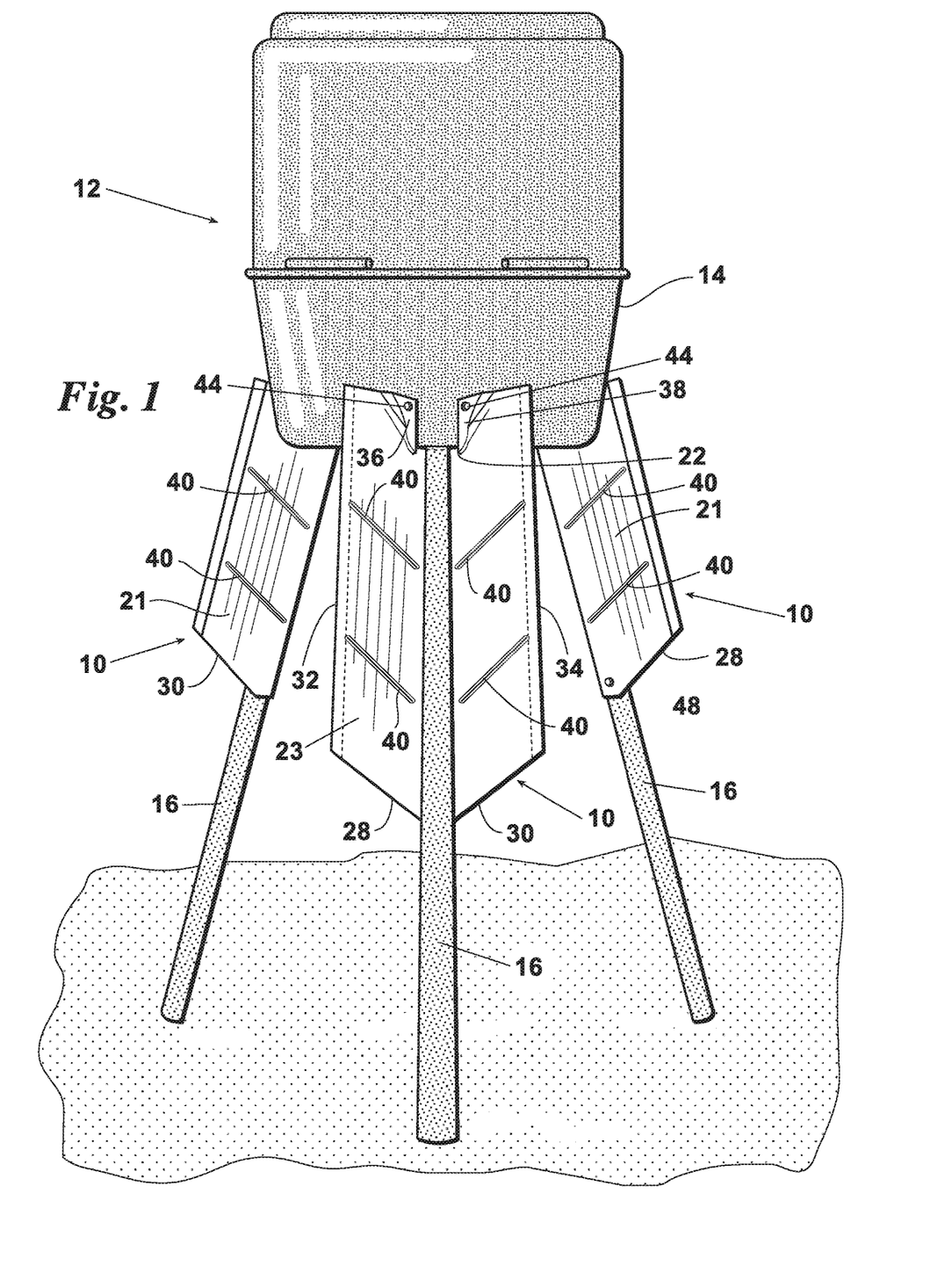
FIG. 1 is a perspective side view of an exemplary wildlife feeder including varmint shields of the present disclosure affixed to its legs.

With reference to the FIGS., FIG. 1 depicts an exemplary wildlife feeder 12 including a plurality of varmint shields, collectively 10 affixed thereon. It should be understood that the wildlife feeder depicted is exemplary and commercially available in various configurations. As such, the wildlife feeder itself, unless configured with the varmint shield of the present disclosure, does not form a part of the present invention. Wildlife feeder 12 includes a typically configured storage hopper 14 and a plurality of legs 16 supporting storage hopper 14. Storage hopper 14 includes an amount of bulk feed stored therein to be dispensed by feeder 12 over time. Wildlife feeder 12 further includes a motor 18 (see FIG. 6), and typically positioned below hopper 14, in feed (typically by gravity) communication which distributes feed from hopper 14 on an interval, commonly timed, basis. As such, wildlife feeders commonly include a timer in electrical communication with the motor as well as a battery which is commonly charged by a solar panel, all in electrical communication (typically wires). Typical wildlife feeders include three legs 16 commonly arranged in a tripod fashion. It is understood, however, that exemplary feeder 12 could include more or fewer legs in alternate configurations as are contemplated and/or commercially available.

FIG. 1 depicts a varmint shield 10 of the present invention affixed to each respective leg 16. Each respective varmint shield 10 prevents varmints from climbing its respective leg 16 and thereby from accessing the feed in hopper 14 and particularly through manual actuation of motor 18.

Next, reference is made to FIGS. 2-5, in combination. Varmint shield 10 includes semi-rigid body 11. As will be apparent to one of skill in the art, body 11 of varmint shield 10 of the present disclosure can be made from flat metal such as tin or other such suitable, feasible metallic materials. Body 11 of varmint shield 10, in an alternate embodiment can be constructed from a plastic type material, or other suitable material. Plastic varmint shields can be extruded or are preferably molded in any suitable/desired thickness in the suitable shape.

As depicted, in a preferred embodiment body 11 of varmint shield 10 of the present disclosure is V-shaped or chevron-shaped in cross-section. In alternate embodiments the varmint shield of the present disclosure may be triangular or round (cylindrical) or tear drop in cross-sectional shape.

Figure 6:
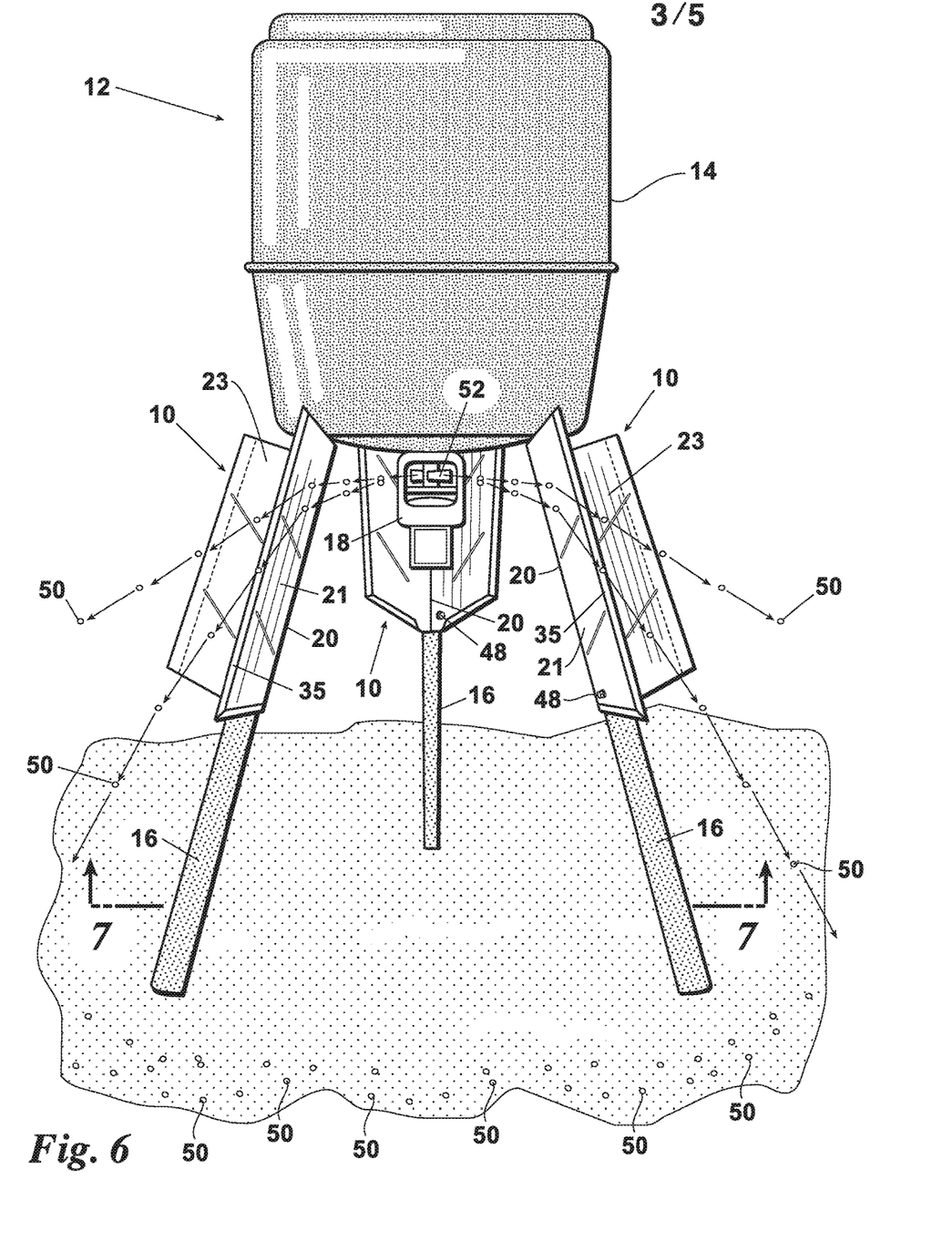
FIG. 6 is perspective side view of the wildlife feeder including varmint shields of FIG. 1 rotated approximately 60 degrees and depicting feed being distributed from the feeder and deflected by the varmint shields of the present disclosure.

In a preferred arrangement, the length of both metal and plastic variations of varmint shield 10 may range from approximately 12"-48" long, more preferably approximately 18"-30" long with 20" long being most preferred. Varmint shield 10 should preferably be of sufficient length so that if a varmint (raccoon) climbs a leg, it will not be able to reach the motor 18 (FIG. 6). The diameter of round or cylindrical versions may range from 4"-10" with 10" inches being most preferable. The triangular embodiment versions may have sides that range from about 2" to about 12" per side and more preferably about 5" to about 12" per side with 10" per side being most preferred. The sides could alternatively be of different lengths as desired/required. It should be understood, however, that the length as well as any of the above-referenced dimensions may be modified as necessary or desired to accommodate the legs of a particular wildlife feeder design without departing from the scope of the present disclosure.

The gauge of metal in a preferred embodiment may be from about 0 ga.-30 ga. and more preferably between about 14 ga. and 36 ga. with about 22 ga. being most preferred. Varmint shield 10 in a preferred embodiment includes 3-4 pre-drilled holes that allow it to be attached to the upright or somewhat upright legs of a wildlife feeder construction.

Body 11 of varmint shield 10 is preferably formed from a flat sheet of tin using a sheet metal bending and shearing machine such as a Baileigh Shear Brake and Roll, Model SBR-5220 available commercially from Elite Metal Tools, Zeeland, Mich. or a Northern Industrial 3-in-1 Shear, Brake and Roll Model 756041 available from Northern Tool & Equipment, Burnsville, Minn.

Body 11 is preferably bent at an angle along its length (FIG. 5) such that a crease 20 (FIGS. 1-5) is formed along the length of body 11 of varmint shield 10.

Figure 2:
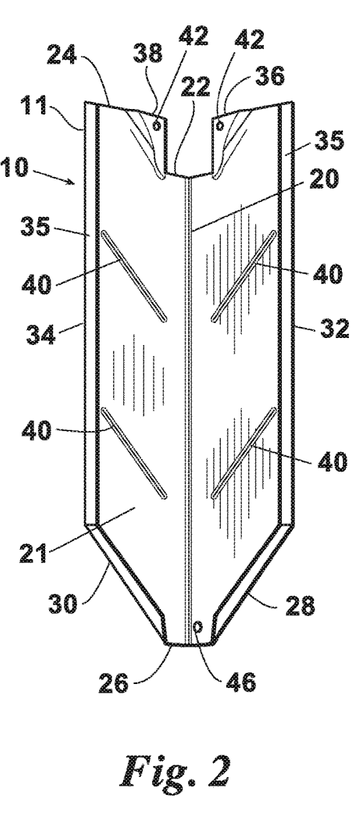
FIG. 2 is a back side view of the varmint shield of the present disclosure depicting a convex geometry as would be viewed from underneath the wildlife feeder of FIG. 1.
Figures 3, 4:
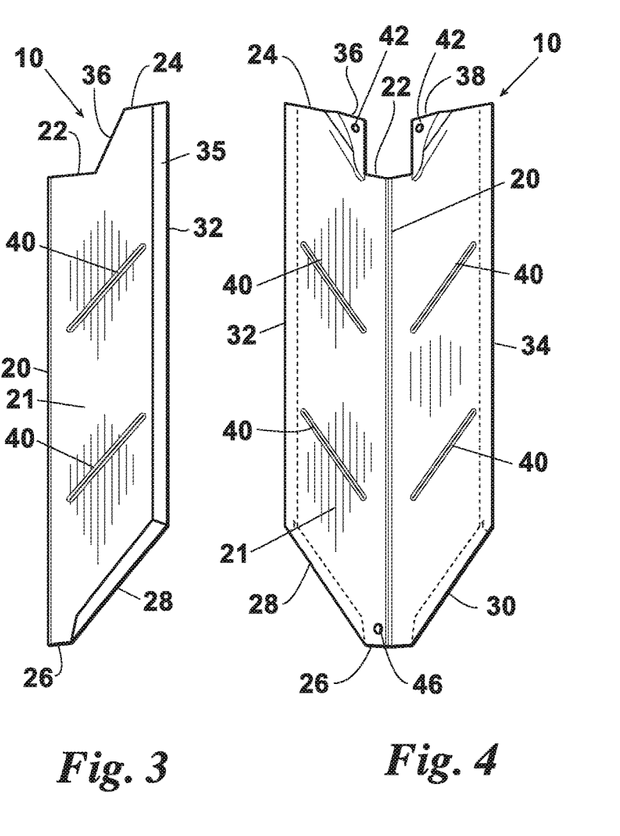
FIG. 3 is an end side view of the varmint shield of the present disclosure.
FIG. 4 is a front side view of the varmint shield of the present disclosure depicting a concave geometry.
Figure 5:
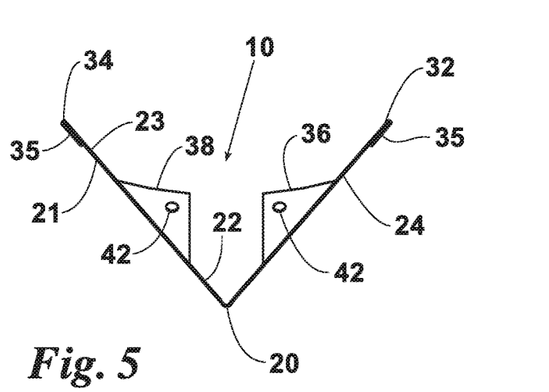
FIG. 5 is a top plan view of the varmint shield of the present disclosure.

FIG. 2 depicts back side 21 of body 11 showing crease 20. In this view body 11 is angled along its length in a convex geometry. FIG. 4 depicts front side 23 wherein body 11 is angled to include a concave geometry along crease 20.

Body 11 is preferably bent at an angle sufficient such that feed expelled from feeder 12 may strike body 11 and be deflected a distance away from feeder 12. For the purpose of exemplification, in a preferred embodiment, an angle of approximately 90 degrees has been found sufficient.

A notch 22 is preferably cut using electric hand shears at a top end 24 of body 11 of varmint shield 10. Bottom end 26 may also be sheared to form a first shoulder 28 and a second shoulder 30. Notch 22 and shoulders 28 and 30 may be cut prior to bending the sheet or after bending the sheet as may facilitate manufacturing.

The edges of shoulders 28 and 30 as well as the edges of first side 32 and second side 34 are preferably folded over flat using the sheet metal bending and shearing machine to form cuffs 35. Folding the edges of shoulders 28 and 30 and sides 32 and 34 to form cuffs 35 adds structural stability/rigidity to body 11 of varmint shield 10.

Varmint shield 10 includes two (2) mounting tabs 36 and 38 in a preferred embodiment at top end 24 that will allow the shield to be attached to the bottom of hopper 14 for added strength as depicted in FIG. 1. Tabs 36 and 38 may be formed in any suitable manner such as by using sheet metal pliers by folding body 11 at notch 22 toward front side 23.

In a preferred embodiment a plurality of beads, collectively 40, may be rolled into the length of body 11 forming varmint shield 10. Beads 40 may be rolled using a bead rolling machine known in the art and may be rolled before or after the sheet is folded in a chevron geometry. Beads 40 add structural rigidity/integrity to body 11 of varmint shield 10. The number of beads 40 could vary depending on the length of body 11 as would be necessary for structural integrity as would be understood by one of skill in the art. In alternate embodiments where larger gauge metal sheets are employed to form body 11, or plastic shields are molded to form body 11, beads 40 may be unnecessary as would be understood by one of skill in the art.

A plurality of holes, collectively 42, may be drilled in mounting tabs 36 and 38 to receive self-tapping screws 44 to secure varmint shield 10 to hopper 14 as depicted in FIG. 1. At least one hole 46 is preferably drilled in or adjacent bottom end 26 to receive at least one respective self-tapping screw 48 inserted through at least one hold 46 and into respective leg 16 of feeder 12 (see FIG. 1, FIG. 6, FIG. 7).

FIG. 6 depicts wildlife feeder 12 in operation. Feed typically drops by gravity in contact with a rotating paddle 52 and is expelled/sprayed 360 degrees around the feeder. Paddle 52 is rotated by motor 18.

As depicted, feed 50 is expelled such that it contacts/strikes back sides 21 of varmint shields 10. Back sides 21, in combination with its angled surface at crease 20 (chevron shape in FIG. 6) forms a feed deflector system such that feed 50 ricochets off back sides 21 and is dispersed, commonly farther, around feeder 12 rather than dropping directly underneath feeder 12. Additionally, and significantly, the feed 50 striking the deflector system creates a distinct sound similar to the sound of hail striking a metal roof. This distinct sound travels a great distance such that desirable wildlife may become accustomed to hearing the sound and understand that feed 50 is available at the feeder and thus be attracted to the physical location of wildlife feeder 12.

Figure 7:
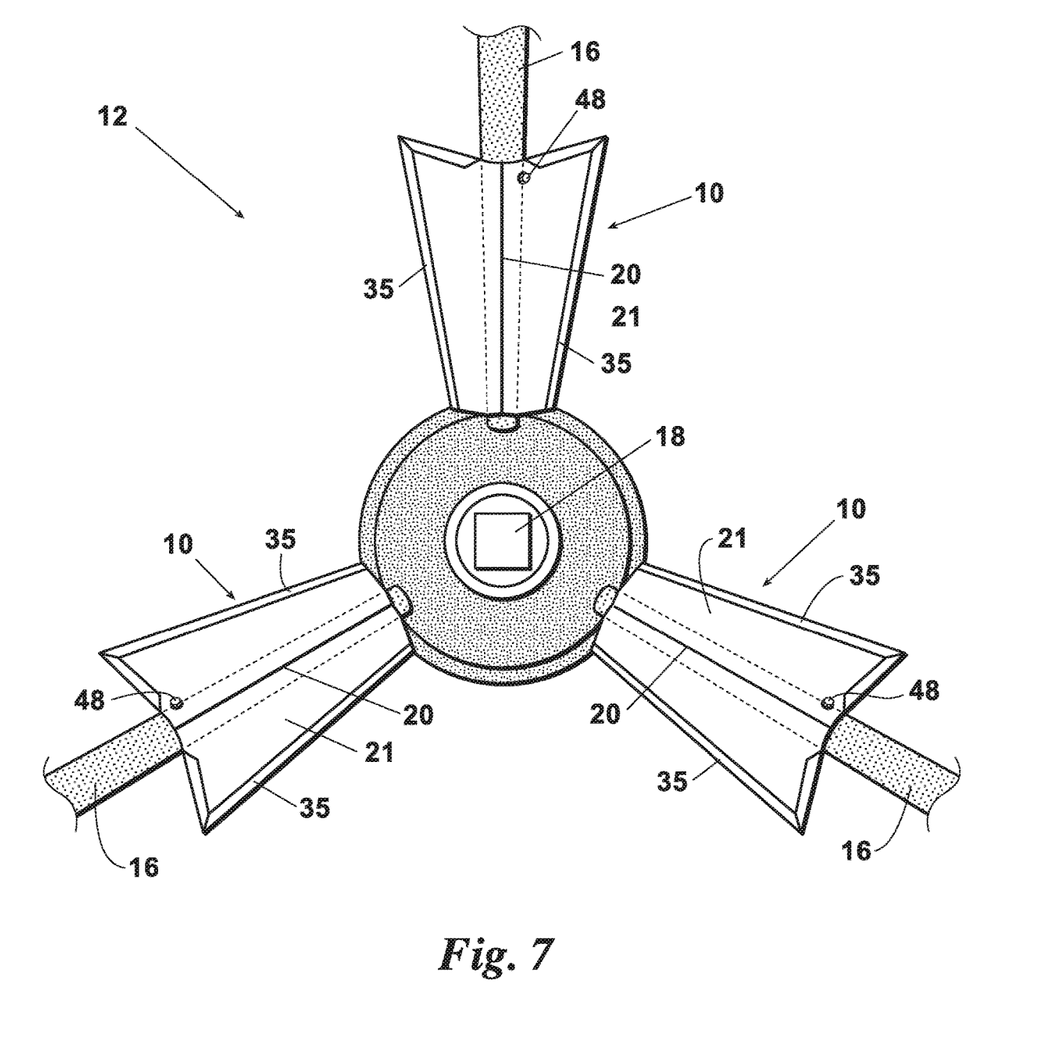
FIG. 7 is a view taken along line 7-7 of FIG. 6.

FIG. 7 depicts wildlife feeder 12 from a bottom view showing the bottom 19 of hopper 14. Varmint shields 10 secured to legs 16 using at least one fastening means such as screws 48 are also shown. Additionally, convex back sides 21 including crease 20 and cuffed edges 35 are shown forming the feed deflector system as described above.

Figure 8:
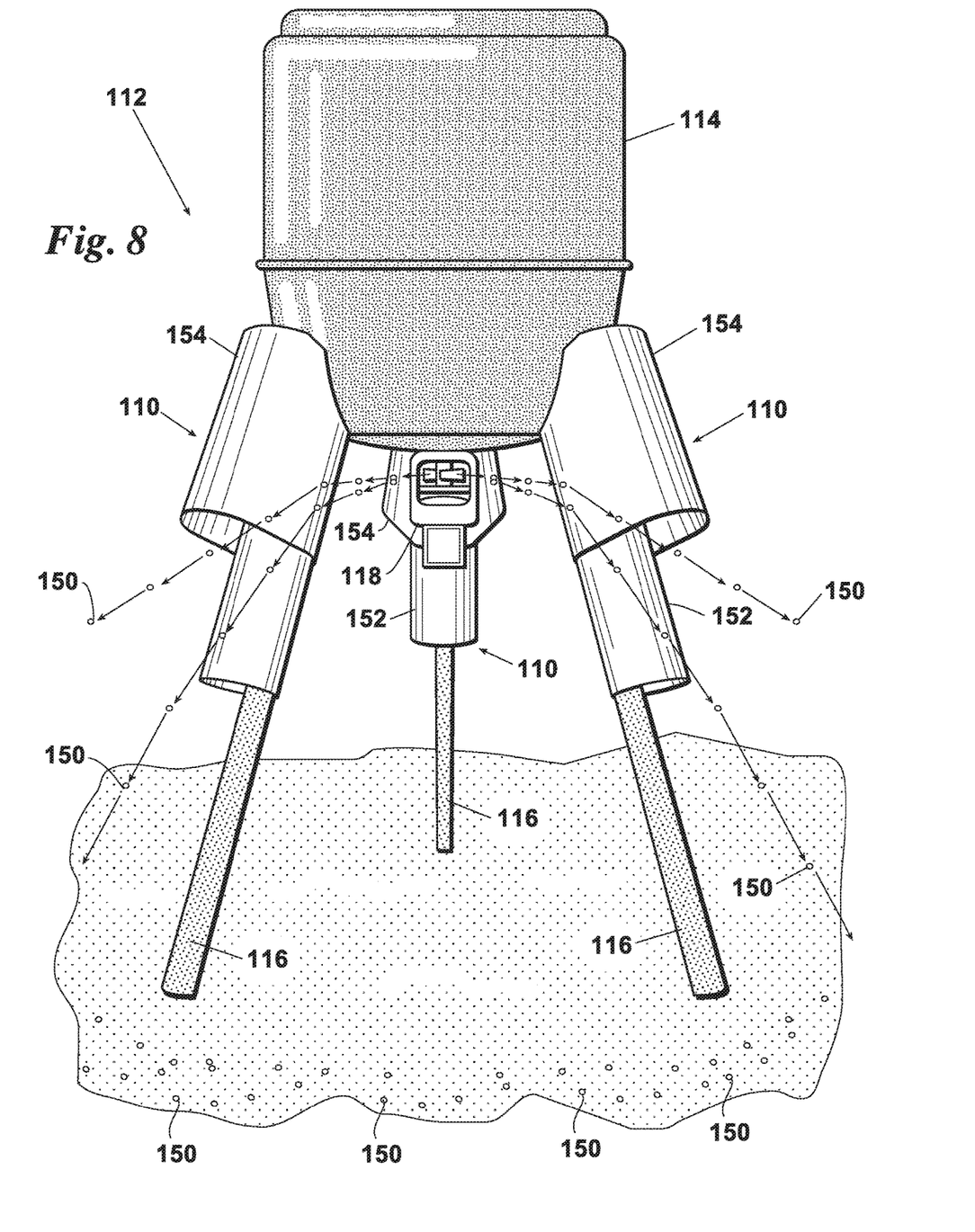
FIG. 8 is a perspective side view of a wildlife feeder including alternate embodiment varmint shields of the present disclosure affixed to its legs and further depicting feed being expelled from the feeder and deflected by the alternate embodiment varmint shields.

FIG. 8 depicts an alternate embodiment of the varmint shield of the present disclosure. The varmint shield of FIG. 8 is constructed of two concentric semi-cylindrical lengths forming the varmint shield body. In the alternate embodiment, the semi-cylindrical lengths are in a tear drop cross sectional geometry.

In the alternate embodiment, a smaller segment 152 is secured to leg 116 of wildlife feeder 112. A second segment 154 is positioned at least partially over the first segment 152. Second segment 154 is secured to hopper 114 as well as first segment 154 and legs 116.

In the alternate geometry, the diameter of first tear drop segment 152 is preferably approximately 6" such that a varmint climbing leg 116, such as a racoon, is unable to fit inside segment 152. Second segment 154 includes a diameter of approximately 10" in a preferred arrangement. The diameter of second tear drop segment 154 is sized larger than that of first teardrop segment 152 such that a varmint attempting to embrace first tear drop segment 152 would encounter second tear drop segment 154 and be unable to continue to climb leg 116.

The body 111 of varmint shield 110 may have a seam from top to bottom, off centered on one of the sides with 3-4 pre drilled mounting holes on both sides of the seam to allow the shield 110 to be installed around a feeder leg which will overlap so that the pre-drilled holes will align. Self-tapping screws may be inserted through the holes to be used to secure the varmint shield to the leg of a feeder.

Alternate embodiment tear drop segments are configured in a tear drop cross section such that the pointed portion is affixed to the bottom of leg 116 pointing toward motor 118. In this way, collectively feed 150 expelled by wildlife feeder 112 by activation of motor 118 will strike the angled sides of the tear drop geometry and be deflected outward and away from wildlife feeder 112.

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A varmint shield for a wildlife feeder for expelling feed having a hopper supported by at least one leg, the varmint shield comprising:
   a body having a length, a back side and a front side, a top end and a bottom end; a first side and a second side;
   a notch cut in said top end;
   a plurality of mounting tabs formed by bending said body at said notch toward said front side;
   said mounting tabs each including at least one hole for receiving a fastening means for securing said body to the at least one leg of the wildlife feeder;
   said body being bent along its length from said top end to said bottom end at an angle sufficient to deflect feed expelled from the wildlife feeder outwardly and away from said wildlife feeder.

2. The varmint shield of claim 1 wherein said body includes a plurality of beads formed along its length.

3. The varmint shield of claim 1 wherein said first side and said second side include edges including cuffs folded along said edges of said first side and said second side.

4. The varmint shield of claim 1 including a first shoulder and a second shoulder cut in said bottom end of said body.

5. The varmint shield of claim 4 wherein said first shoulder and said second shoulder include edges folded to form cuffs.

6. The varmint shield of claim 1 further including at least one hole drilled in said body adjacent said bottom end for securing said body to the at least one leg of the wildlife feeder.

7. A varmint shield for a wildlife feeder for expelling feed having a hopper supported by at least one leg, the varmint shield comprising:
   a body having a length, a back side and a front side, a top end and a bottom end; a first side and a second side;
   a notch cut in said top end;
   a plurality of mounting tabs formed by bending said body at said notch toward said front side;
   said mounting tabs each including at least one hole for receiving a fastening means for securing said body to the at least one leg of the wildlife feeder;

said body being creased along its length from said top end to said bottom end at an angle sufficient to deflect feed expelled from the wildlife feeder outwardly and away from said wildlife feeder said body being adapted for being secured to the at least one leg along said crease.

\* \* \* \* \*